W. M. CROSS.
DESTRUCTION OF GARBAGE AND RECOVERY OF BY-PRODUCTS.
APPLICATION FILED JULY 27, 1908. RENEWED OCT. 23, 1909.
956,569.
Patented May 3, 1910.
7 SHEETS—SHEET 1.
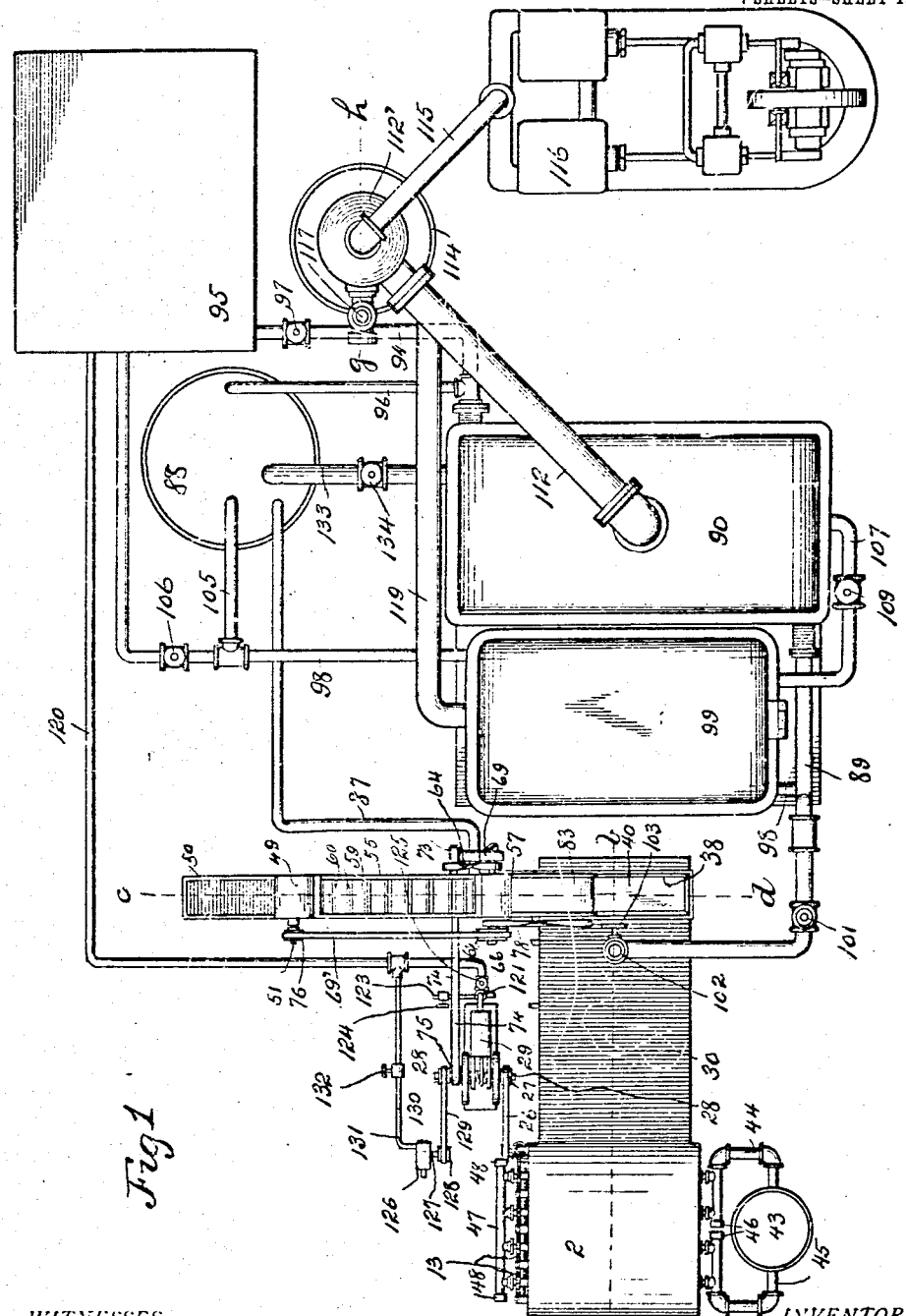

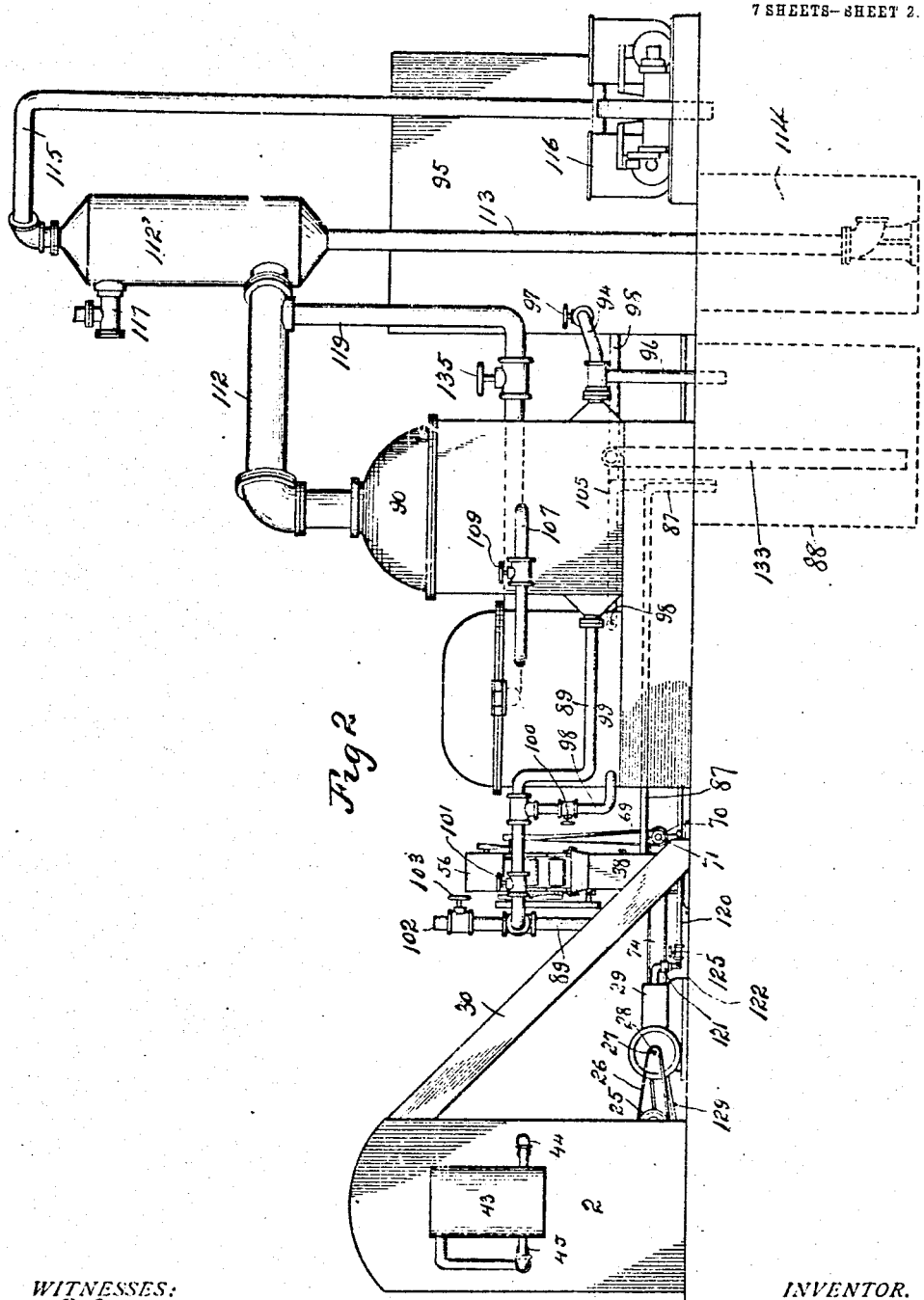

W. M. CROSS.
DESTRUCTION OF GARBAGE AND RECOVERY OF BY-PRODUCTS.
APPLICATION FILED JULY 27, 1908. RENEWED OCT. 23, 1909.

956,569.

Patented May 3, 1910.

7 SHEETS—SHEET 3.

WITNESSES:

INVENTOR.
Walter M. Cross
BY
Warren D. House
His ATTORNEY.

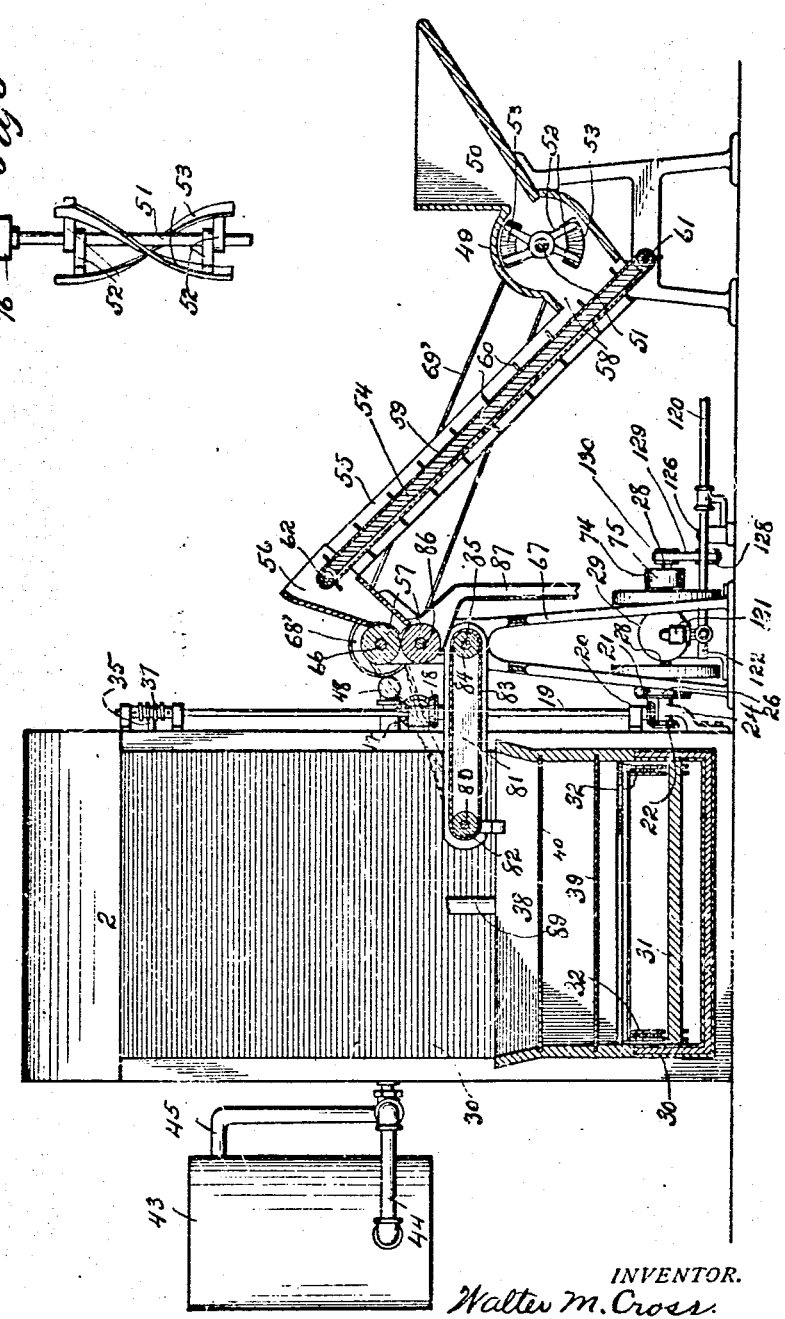

W. M. CROSS.
DESTRUCTION OF GARBAGE AND RECOVERY OF BY-PRODUCTS.
APPLICATION FILED JULY 27, 1908. RENEWED OCT. 23, 1909.
956,569.
Patented May 3, 1910.
7 SHEETS—SHEET 5.
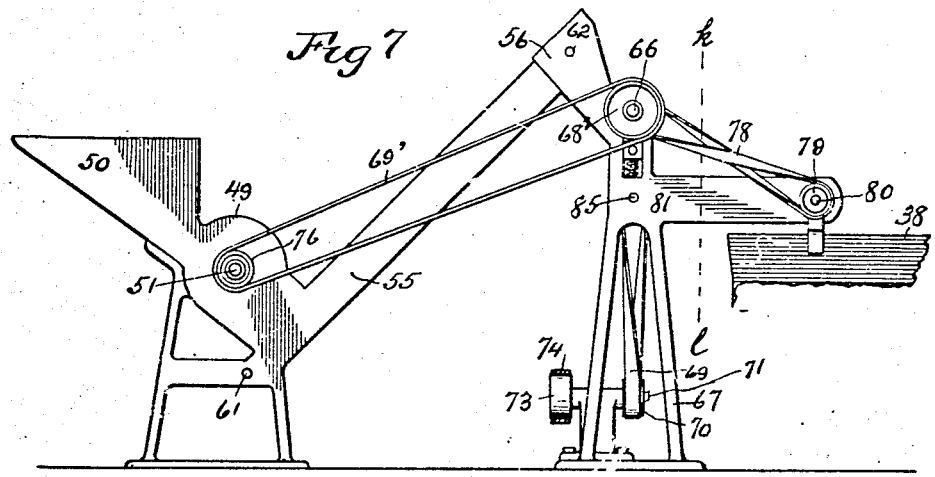
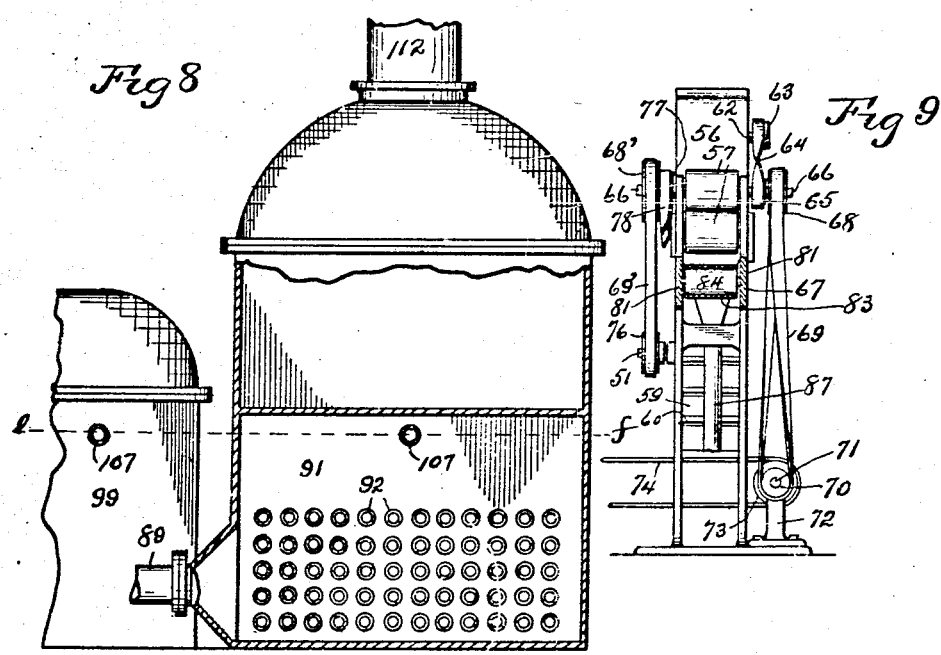
WITNESSES:
INVENTOR.
Walter M Cross
BY
Warren D. House
His ATTORNEY.

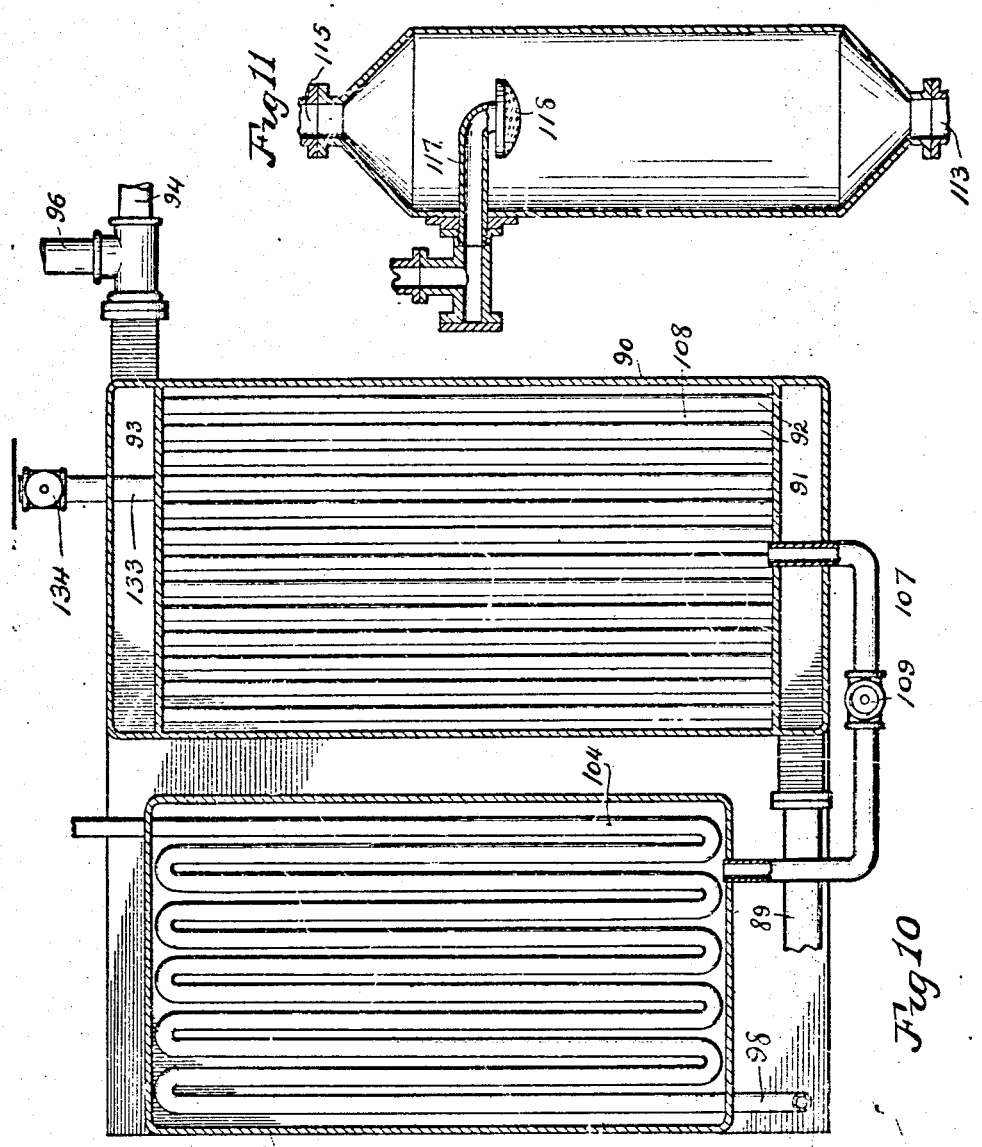

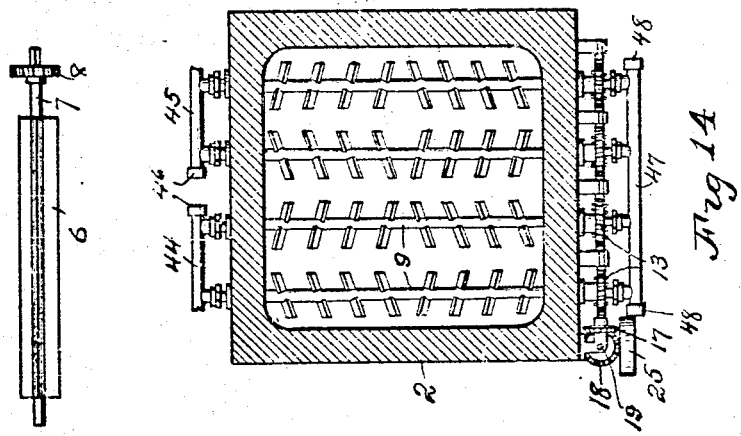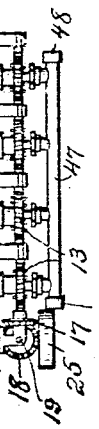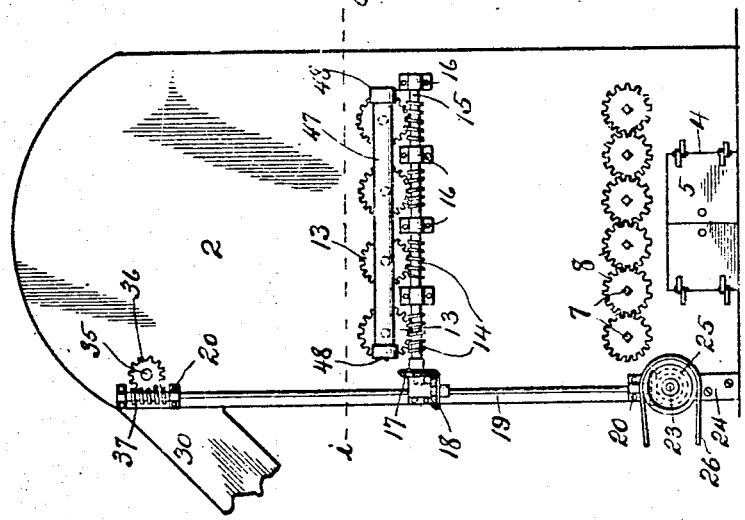

UNITED STATES PATENT OFFICE.

WALTER M. CROSS, OF KANSAS CITY, MISSOURI.

DESTRUCTION OF GARBAGE AND RECOVERY OF BY-PRODUCTS.

956,569.  Specification of Letters Patent.  Patented May 3, 1910.

Application filed July 27, 1908, Serial No. 445,563. Renewed October 23, 1909. Serial No. 524,230.

*To all whom it may concern:*

Be it known that I, WALTER M. CROSS, a citizen of the United States, residing at Kansas City, in the county of Jackson and State of Missouri, have invented certain new and useful Improvements in the Destruction of Garbage and Recovery of By-Products, of which the following is a specification.

My invention relates to improvements in processes for destroying garbage and other refuse.

The object of my invention is to provide a process by which garbage and other refuse may be economically destroyed, without the dissemination of noxious vapors and gases in the atmosphere, and by which valuable products due to such destruction may be saved.

A novel and important feature of my invention consists in condensing into liquid vapors and gases produced by heating the garbage, the liquid so produced being employed for condensing said vapors and gases the heat from which is at the same time employed to evaporate the liquid for recovering the valuable products contained therein.

A further novel feature consists in retaining the vapors and gases at a pressure different, and preferably greater than the pressure of the liquid used for condensing said vapors and gases, the pressure upon the liquid being preferably less than atmospheric pressure. By retaining the condensing liquid at a pressure less than the pressure upon the vapors and gases at the time of condensation, the condensing liquid, as hereinafter explained is rendered very efficient for the purpose.

A further novel feature of my invention consists in fixing the condensing liquid, preferably by mixing with it a fixing agent, such as sulfuric acid, and employing the fixed liquid for condensing the vapors and gases which at the same time are employed to evaporate the fixed liquid to recover the valuable products.

Another novel feature consists in dividing into two portions the vapors and gases to be condensed, then condensing said two portions, employing the liquid produced thereby for condensing one portion the heat from which evaporates the liquid to a syrupy consistency, and employing the syrupy liquid for condensing the other portion the heat from which evaporates the syrupy liquid so that the valuable products are separated therefrom in shape for recovery.

Other novel features are hereinafter fully described and claimed.

In carrying my invention into effect the garbage may be heated so as to produce gas and vapor by distillation in a retort or by burning the garbage in a gas producer. The last named method is the one I prefer as fuel other than the garbage is not required for its destruction.

In the accompanying drawings I have illustrated an apparatus of my invention, which is adapted to carry into effect the preferred form of my improved process.

In the drawings referred to, Figure 1 is a plan view of the apparatus. Fig. 2 is an elevation of the apparatus. Fig. 3 is a vertical sectional view of the gas producer and parts connected therewith, taken on the dotted line *a—b* of Fig. 1. Fig. 4 is a top view of the steam pipe employed to dry the garbage as it passes into the producer chamber. Fig. 5 is a vertical sectional view taken on the dotted line *c—d* of Fig. 1. Fig. 6 is a top view, enlarged, of the knives employed to chop the garbage into small sections, the knives being shown mounted on the shaft which supports them. Fig. 7 is an enlarged side elevation of the mechanism employed for chopping the garbage and then compressing it to squeeze therefrom the excess moisture. Fig. 8 is a view, enlarged, partly in vertical section and partly in elevation of that portion of the apparatus which is employed to condense the vapors and condensable gases. Fig. 9 is a vertical sectional view on the dotted line *k—l* of Fig. 7. Fig. 10 is a horizontal sectional view on the dotted line *e—f* of Fig. 8. Fig. 11 is a vertical sectional view on the dotted line *g—h* of Fig. 1. Fig. 12 is an elevation of the producer in which the garbage is burned. Fig. 13 is a plan view of one of the grate bars of the producer. Fig. 14 is a horizontal sectional view on the dotted line *i—j* of Fig. 12.

Similar characters of reference denote similar parts.

1 denotes the combustion chamber of an ordinary gas producer 2, the upper end of which is provided with a vapor and gas outlet 3, which also serves as an inlet for garbage.

4 denotes an air inlet disposed in the lower end of one side wall of the producer and provided with a closure 5. Above the inlet 4 are horizontal parallel grate bars 6, mounted on rotary shafts 7. Secured to said shafts, as shown in Fig. 12, are spur gear wheels 8 which mesh with each other. By turning one of said shafts all of the grate bars may be turned. Intermediate the grate bars 6 and the outlet 3 are a plurality of horizontal parallel tubular shafts 9, which extend through opposite walls of the producer 2 and are provided each with lateral arms 10. When the shafts 9 are rotated the garbage is stirred and prevented from forming into a compact mass. A plurality of worm wheels 13, are secured respectively to the shafts 9 outside of the producer 2. These worm wheels mesh respectively with spirally threaded portions 14, provided on the periphery of a horizontal worm shaft 15, mounted in suitable bearings 16, secured to the side wall of the producer 2. Secured to the shaft 15 is a bevel gear wheel 17, which meshes with a bevel gear wheel 18, secured upon a vertical shaft 19, which is rotatively mounted in bearings 20, secured to the wall of the producer. Upon the lower end of the shaft 19, as shown in Fig. 5, is secured a beveled gear wheel 21, which meshes with a bevel gear wheel 22, rigidly secured upon a horizontal shaft 23, rotatively mounted in a bracket 24, secured to the producer 2, as shown in Fig. 12. Rigidly secured to the shaft 23 is a pulley 25 connected by a belt 26 with a pulley 27, secured upon the crank shaft 28 of an ordinary gas engine 29.

Referring particularly to Fig. 3, 30 denotes an inclined conductor, the upper end of which is connected with the outlet 3. Disposed longitudinally in the conductor 30 is a partition 31 which is embraced by an endless belt 32, comprising preferably two parallel sprocket chains, which are connected with each other by transverse metal plates 33. The sprocket chains 32 are mounted upon sprocket wheels 34, secured upon two shafts 35, rotatively mounted respectively in the upper and lower ends of the conductor 30. Upon the outer end of the upper shaft 35, see Fig. 12, is secured a worm wheel 36 which meshes with a worm 37, secured upon the shaft 19. When the engine 29 is run the endless belt 32 will be driven, by the mechanism just described, in a direction such that garbage placed in the lower end of the conductor 30 will be carried upwardly into the producer chamber 1 by the plates 33, and upon the upper side of the partition 31. In the upper side and adjacent the lower end of the conductor 30, see Fig. 3, is a vertical feed inlet 38, provided with two horizontal slidable closures 39 and 40, disposed one above the other.

The garbage is placed upon the closure 40, which is then withdrawn from the closed position so as to deposit the charge of garbage upon the closure 39. The closure 40 is then moved to the closed position and the closure 39 withdrawn to the open position so as to deposit the garbage upon the partition 31. For spreading the garbage in a thin sheet a vertical plate 41 is vertically adjustable through a slot provided in the upper wall of the conductor 30, as shown in Fig. 3. For drying the garbage preparatory to depositing it in the producer, a sinuously formed pipe 42, best shown in Figs. 3 and 4, is mounted in the conductor 30 above the partition 31, intermediate the inlets 3 and 38. The ends of the pipe 42 are connected with a reservoir, not shown, which supplies the pipe with a heating fluid, such as steam.

Referring to Figs. 1, 5, 12 and 14, 43 denotes a water tank to which are connected one set of ends of two conductors 44 and 45, the opposite ends of which are closed by caps 46. One set of ends of the tubular shafts 9 are rotatively mounted in lateral branches provided in the conductors 44 and 45. The opposite ends of said tubular shafts 9 are rotatively mounted in lateral branches provided in a horizontal tubular header 47, the ends of which are closed by caps 48. Suitable packing means are provided to prevent leakage around the shafts 9 where they engage the branches of the conductors 44, 45 and 47. Cold water passes from the tank 43 by the conductor 44 through some of the shafts 9 to the header 47, and thence by others of the shafts 9 to the conductor 45 and thence to the tank 43.

Referring particularly to Figs. 5, 7 and 9, 49 denotes a shredding box, provided with a feed inlet 50, through which garbage is fed into the box. Extending horizontally through said box 49 is a horizontal rotary shaft 51, having secured thereto radial arms 52 to which are secured suitable cutting devices such as spiral cutting blades 53. The box 49 is disposed above the lower end of an inclined plate 54 to the edges of which are secured side plates 55, which form a channel through which the garbage is upwardly carried and deposited in a hopper 56 which conveys the garbage to and between compressing rollers 57. The shredding box 49 is provided with an outlet 58 through which the garbage passes after being shredded when it is delivered upon the inclined plate 54.

A belt 59, provided with transverse plates 60, embraces the inclined plate 54 and is mounted upon two transverse rotary shafts 61 and 62, disposed respectively adjacent the lower and upper ends of the plate 54. The shaft 62 has secured to it a pulley 63 connected by a belt 64 with a pulley 65 secured upon a horizontal shaft 66 which is rotatively mounted in a suitable supporting frame 67, as shown in Figs. 5, 7 and 9. Rotation is imparted to the shaft 66 by means of a pulley 68 secured thereto and connected by a belt 69 with a pulley 70 secured upon a horizontal shaft 71, rotatively mounted in a suitable bearing 72. Secured to the shaft 71 is a pulley 73 which is connected by a horizontal belt 74 with a pulley 75 mounted on the crank shaft 28 of the engine 29, as shown in Figs. 1 and 5. Secured on the shaft 51 is a pulley 76 which is connected by a belt 69' with a pulley 68' secured on the shaft 66. Secured also upon the shaft 66 is a pulley 77 which is connected by a belt 78 with a pulley 79, which is secured upon a horizontal shaft 80 rotatively mounted in two arms 81 which extend horizontally from the frame 67 over the feed inlet 38. On the shaft 80 is mounted, between the arms 81, a roller 82 which is connected by a horizontal belt 83 with a horizontal roller 84, disposed below the lower compression roller 57 and mounted intermediate the arms 81 upon a horizontal shaft 85, rotatively mounted in the frame 67. The upper compression roller 57 is secured rigidly upon the shaft 66, and the lower roller 57 is secured upon a horizontal shaft 86 which is rotatively mounted in the frame 67.

When the engine 29 is run the belts 32, 59 and 83 will be driven and the cutting blades 53 and rollers 57 will be rotated by means of the mechanism just hereinbefore described. Garbage deposited in the feed inlet 50 will pass into the shredder box 49 where it will be shredded by the blades 53, after which it will pass out of the shredder box and be carried by the belt 59 into the hopper 56 from which it will pass between the rollers 57 upon the belt 83, which will deposit it into the feed inlet 38 of the conductor 30, through which it will be carried, as already described, and deposited in the producer chamber 1. A large amount of moisture will be squeezed from the garbage by the rollers 57 and will flow from said rollers into a conductor 87 which discharges into a receptacle for liquid said receptacle being denoted by 88. The garbage entering the conductor 30 will be first dried by heat from the conductor 42 and will then pass into the producer chamber 1 where it will first be subjected to dry distillation and afterward to combustion. The vapors and gases produced by the incineration of the garbage will pass from the producer chamber 1 into the conductor 30, from which it will pass by a conductor 89. The other end of the conductor 89 is connected to a condenser 90, see Fig. 10. Said condenser 90 is provided at one side with a vertical chamber 91 into which the conductor 89 discharges. The chamber 91 is connected by horizontal condensing tubes 92 with a vertical chamber 93 disposed at the other side of the condenser and discharging into a conductor 94 which, see Fig. 2, discharges into a suitable gas reservoir 95. One end of a conductor 96 is connected to the conductor 94 and the other end discharges into a liquid reservoir 88. Intermediate the condenser 90 and gas reservoir 95 in conductor 94 is located a shut off valve 97. A branch conductor 98 is connected at one end with the conductor 89 and its other end is connected with a supplementary condenser 99. In the conductor 98 is located a shut off valve 100, as shown in Fig. 2. The conductor 89 is provided intermediate the conductor 30 and conductor 98 with a shut off valve 101. Intermediate the valve 101 and conductor 30 the conductor 89 is provided with a vent pipe 102 having a shut off valve 103. That portion of the conductor 98 located in the condenser 99, see Fig. 10, is a horizontal sinuously formed portion 104 which is located adjacent to the bottom of the condenser. The branch conductor 98, see Figs. 1 and 2, is connected with the reservoir 95 and intermediate said reservoir and the condenser 99 is provided with a branch conductor 105 which discharges into the reservoir 88. The conductor 98 intermediate the branch 105 and reservoir 95 is provided with a shut off valve 106.

A horizontal conductor 107, see Figs. 1, 2 and 10, has one end connected with the condenser 99, the other end is connected with a chamber 108 located in condenser 90 intermediate chambers 91 and 93. A shut off valve 109 is located in conductor 107. One end of a conductor 112, see Figs. 1, 2 and 11, is connected to the top of chamber 108, the other end being connected to a condensing chamber 112', the lower end of which is connected to the upper end of a conductor 113, the lower end of which is located in a well 114. The upper end of condenser 112', is connected to one end of a conductor 115 the other end of which is connected to a suitable exhaust pump 116. One end of a conductor 117 is connected to condensing chamber 112', said end being provided preferably with a spraying head 118 by which water discharged from the conductor is diffused in the condensing chamber. The other end of conductor 117 is connected to a suitable water supply, not shown. A conductor 119 has one end connected to conductor 112, the other end being connected with condenser 99. When the pump 116 is operated a partial vacuum is formed in condensers 90, 99 and 112', thus causing the steam and vapors forming in chambers 99 and 108 to pass into condenser 112' where said steam and vapors are condensed by the water sprayed from conductor 117 and flow by the conductor 113 into the well 114. The condenser 112' is located at a height sufficient to prevent the atmospheric pressure from forcing liquid in the well 114 into said condenser, that is the surface of the liquid in well 114 should be at least more than 34 feet lower than the top of conductor 113.

As shown in Fig. 1, one end of a conductor 120 is connected to the gas reservoir 95, the other end, as shown in Figs. 1, 2 and 5, being connected to the carbureter of the gas engine 29, said carbureter being indicated by 121. The carbureter is also provided with an air intake 122 and has connected to it one end of a gas conductor 123 the other end of which is connected with a suitable gas supply. In the conductor 123 is a valve 124. In conductor 120 is located a shut off valve 125.

In the initial operation of the apparatus the gas engine is first operated by gas supplied by conductor 123, the valve 124 being opened and the valve 125 being closed until gas of the proper quality is supplied to the gas reservoir 95, at which time the valve 124 is closed and valve 125 is opened, permitting the gas engine thereafter to obtain its gas supply from the reservoir 95.

In order that a suction may be created through the producer chamber 1, conductor 30, conductor 89, conductor 98, conductor 94, and chambers 91, 93 and 108, while the valve 125 is closed, an air pump 126 is provided. This pump is provided with a shaft 127 on which is secured a pulley 128 connected by a belt 129 with a pulley 130 secured on the crank shaft 28 of the gas engine 29. A conductor 131 is connected at one end with the pump 126, the other end being connected with conductor 120. A valve 132 is located in conductor 131. By opening valve 132 and closing valve 125, the pump 126 will draw the fluid from the gas reservoir 95, thus creating a suction by which air is drawn into the producer chamber 1 through the air inlet 4 for the purpose of burning the garbage. After gas of the proper quality has entered the reservoir 95, the pump 126 may be stopped and the valve 132 closed, the valve 125 at that time being opened and the valve 124 closed. The gas and vapors passing into the conductor 89 from the producer chamber by means of the conductor 30 are divided, part of the gas and vapor passing into chamber 91, thence through the tubes 92 into chamber 93 and thence into conductor 94. The other portion of the gas and vapor will pass by conductor 98 through the condenser 99. The condensable gas and vapors passing through the tubes 92 will be condensed and thus separated from the fixed gas, such as hydrogen and carbon monoxid, which latter gases will pass by conductor 94 into the gas reservoir 95. The condensable vapors and gases will be carried by the conductor 96 into the well 88. In a like manner the condensable gases and vapors passing through conductor 98 will be condensed in the sinuous portion 104, the fixed gas passing into the reservoir 95, while the condensed gas and vapor will pass into the well 88 by the conductor 105. The liquid contained in the well 88 is fixed by mixing with it a fixing agent, such as sulfuric acid. By this treatment the ammonia is converted into ammonium sulfate. The fixed liquid is then drawn by suction from the well 88 through the conductor 133 one end of which extends into the well 88, the other end being connected with chamber 108.

By reason of the action of the pump 116 a partial vacuum is maintained in the upper portions of condenser 99 and chamber 108. The liquid drawn into chamber 108 from the well 88 will receive heat from the tubes 92 and will boil at a temperature lower than 212 degrees Fahrenheit. Thus all vapors and gases condensable at the temperature of the liquid in chamber 108 will be condensed in tubes 92, and at the same time the heat from said gas and vapor will evaporate the liquid in chamber 108 to a syrupy constituency. In this form the liquid passes from chamber 108 by the conductor 107 into the condenser 99, in which chamber it will be evaporated into a powder or crystalline condition. The valve 109 is regulated so that the proper flow shall be maintained through the conductor 107. The condenser 99 is provided with a hinged cover, which on being raised permits the removal of the dry ammonium sulfate and other products contained in chamber 99. By reason of the low pressure in chamber 108 and condenser 99 steam carried in conductors 89 and 98 will be readily condensed, and at the same time such steam will cause a ready evaporation of the water contained in chamber 108 and condenser 99. The surface of liquid contained in the well 88 is retained sufficiently high for atmospheric pressure forcing the fixed liquid into chamber 108 through the conductor 133. A shut off valve 134 is provided in conductor 133, so that the amount of liquid passing therethrough may be regulated to correspond with the evaporation of the liquid into chamber 108. By means of the valve 100, the amount of gas passing through condenser 99 by way of conductor 98 may be regulated to correspond with the evaporation occurring in said condenser. The conductor 119 is provided with a shut off valve 135 by which the pressure in condenser 99 may be regulated.

Having thus described my invention, what I claim and desire to secure by Letters Patent, is:—

1. The process consisting in condensing into liquid vapors and gases produced by heating material, such as garbage, then fixing said liquid, said fixed liquid being employed for condensing said vapors and gases the heat from which is at the same time employed to evaporate said fixed liquid, said fixed liquid at the time being subjected to a pressure less than that to which said vapors and gases are subjected.

2. The process consisting in condensing into liquid vapors and gases produced by heating material, such as garbage, then fixing said liquid, and employing said fixed liquid for condensing said vapors and gases, the heat from which is at the same time employed to evaporate said fixed liquid, said fixed liquid being at the time subjected to a pressure different than that to which said vapors and gases are subjected.

3. The process consisting in condensing into liquid vapors and gases produced by heating material, such as garbage, then mixing with said liquid a fixing agent, such as sulfuric acid, and employing said fixed liquid for condensing said vapors and gases the heat from which is at the same time employed to evaporate said fixed liquid, said fixed liquid at the time being subjected to a pressure different from that to which said vapors and gases are subjected.

4. The process consisting in condensing into liquid vapors and gases produced by heating material, such as garbage, then mixing with said liquid a fixing agent, such as sulfuric acid, and employing said fixed liquid for condensing said vapors and gases the heat from which is at the same time employed to evaporate said fixed liquid, said fixed liquid at the time being subjected to a pressure less than the pressure to which said vapors and gases are subjected.

5. The process consisting in condensing into liquid vapors and gases produced by heating material, such as garbage, then fixing said liquid, employing said fixed liquid for condensing said vapors and gases the heat from which is employed to evaporate said fixed liquid to a syrupy constituency, said fixed liquid at the time being subjected to a pressure different from that to which said vapors and gases are subjected, and then evaporating said syrupy liquid by heat derived from said vapors and gases.

6. The process consisting in dividing into two portions vapors and gases produced by heating material, such as garbage, then condensing into liquid said two portions, then fixing said liquid, employing said fixed liquid for condensing one portion the heat from which is employed to evaporate said fixed liquid to a syrupy constituency, and evaporating said fixed syrupy liquid by heat derived from the other portion, which other portion is thereby condensed into liquid.

7. The process consisting in dividing into two portions vapors and gases produced by heating material, such as garbage, then condensing into liquid said two portions, then fixing said liquid, employing said fixed liquid for condensing one portion the heat from which is employed to evaporate said fixed liquid to a syrupy constituency, the fixed liquid at the time being subjected to a pressure different from that to which the vapors and gases are subjected, and evaporating said syrupy fixed liquid by heat derived from the other portion, which other portion is thereby condensed into a liquid.

8. The process consisting in dividing into two portions vapors and gases produced by heating material, such as garbage, then condensing into liquid said two portions, then fixing said liquid, employing said fixed liquid for condensing one portion the heat from which is employed at the same time to evaporate said liquid to a syrupy constituency, and evaporating said fixed syrupy liquid by heat derived from the other portion which is thereby condensed into liquid, said liquid products during evaporation being subjected to a pressure different from that to which said two portions are subjected.

9. The process consisting in burning garbage, then subjecting the resultant gases and vapors to condensation action, then fixing the resulting liquid, employing said fixed liquid for condensing the condensable gases and vapors, the heat from said gases and vapors being at the same time employed to evaporate said fixed liquid, said liquid at the time being subjected to a pressure different from that to which the vapors and gases are subjected.

10. The process consisting in burning garbage, then subjecting the resultant gases and vapors to condensation action, then fixing the resultant liquid, employing said fixed liquid for condensing the condensable gases and vapors the heat from which is at the same time employed to evaporate said fixed liquid, said fixed liquid at the same time being subjected to a pressure less than that to which the vapors and gases are subjected.

11. The process consisting in burning garbage, then subjecting the resultant gases and vapors to condensation action, then fixing the resultant liquid, employing said fixed liquid for condensing the condensable gases and vapors the heat from which is at the same time employed to evaporate said fixed liquid, said fixed liquid at the same time being subjected to pressure less than atmospheric and less than the pressure to which the gases and vapors are subjected.

12. The process consisting of burning garbage, then subjecting the resultant gases and vapors to condensation action, then mixing with the resultant liquid a fixing agent, such as sulfuric acid, employing said fixed liquid for condensing the condensable vapors and gases the heat from which is at the same time employed to evaporate said fixed liquid, said fixed liquid at the time being subjected to a pressure different from that to which the vapors and gases are subjected.

13. The process consisting in burning garbage, then subjecting the resultant gases and vapors to condensation action, then mixing with the resultant liquid a fixing agent, such as sulfuric acid, employing said fixed liquid for condensing the condensable vapors and gases the heat from which at the same time is employed to evaporate said fixed liquid, said fixed liquid at the time being subjected to a pressure less than that to which the vapors and gases are subjected.

14. The process consisting in burning garbage, then subjecting the resultant gases and vapors to condensation action, the gases and vapors being divided into two portions, then fixing the liquid resulting from such condensation action, employing the fixed liquid for subjecting one portion to condensation action, the heat from said portion being employed to evaporate said fixed liquid to a syrupy constituency, and then employing the syrupy liquid for subjecting the other portion to condensation action, the heat from said other portion being at the same time employed in evaporating said syrupy liquid.

15. The process consisting in burning garbage, then subjecting the resultant gases and vapors to condensation action, the gases and vapors being divided into two portions, then fixing the liquid resulting from condensation, employing the fixed liquid for subjecting one portion to condensation action, the heat from said portion being employed to evaporate said fixed liquid to a syrupy constituency, and then employing the syrupy liquid for subjecting the other portion to condensation action, the heat from said other portion at the same time being employed to evaporate said syrupy liquid, the liquid at the times of evaporation being subjected to a pressure different from the vapors and gases.

In testimony whereof I have signed my name to this specification in presence of two subscribing witnesses.

WALTER M. CROSS.

Witnesses:
E. B. House,
J. D. Forrester.